March 4, 1969    G. B. RABE ETAL    3,430,442

VALVE MECHANISM

Filed Dec. 8, 1966

INVENTORS
GEORGE B. RABE
WALTER B. GROSSMAN

BY Edward R. Grant

United States Patent Office 3,430,442
Patented Mar. 4, 1969

3,430,442
VALVE MECHANISM
George B. Rabe, Sparta, and Walter B. Grossman, Fair Lawn, N.J., assignors to Thiokol Chemical Corporation, Bristol, Pa., a corporation of Delaware
Filed Dec. 8, 1966, Ser. No. 600,211
U.S. Cl. 60—39.14                4 Claims
Int. Cl. F02c 7/26; F16k 7/14, 17/40

This invention relates to valves and more particularly to a valve mechanism for a rocket motor.

In the testing and operation of rocket motors having liquid fuels and oxidizers, there is often a need for a valve mechanism whereby propellant flow passages can be hermetically sealed and opened instantaneously. The present invention improves the shock resistance of shear cups and shear slides which have heretofore been extensively employed as valves for the aforementioned purposes. More particularly, when applied to rocket motors propelled by two or more liquids, this invention provides a mechanism which reliably prevents accidental ignition of said liquids as a result of a uni-directional shock load.

Accordingly, it is an object of this invention to provide a shock-resistant means by which fluid flow passages can be hermetically sealed yet rapidly opened.

Another object of this invention is to prevent accidental ignition of a rocket motor having two or more liquid propellants.

Figure 1:
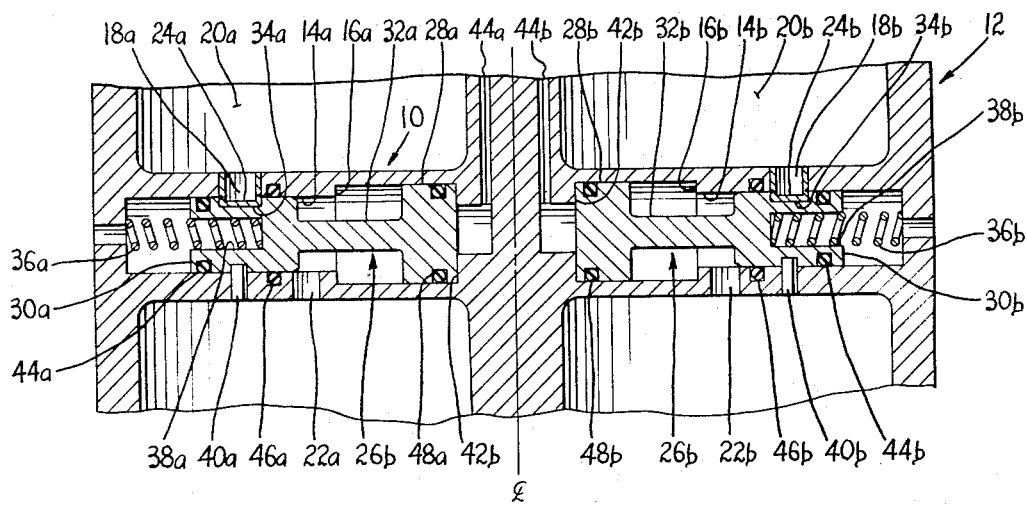
Figure 2:
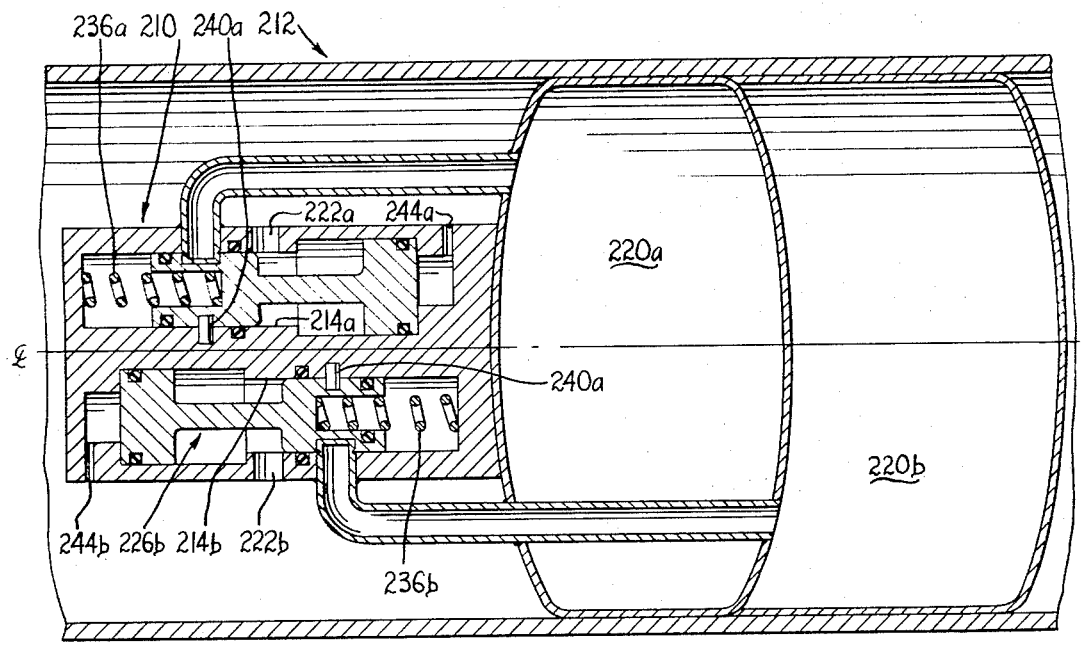

Other objects and advantages of this invention will become apparent by consideration of the following description of two embodiments thereof, in which reference is made to the accompanying drawings, wherein:

FIGURE 1 is a fragmentary sectional view taken along the longitudinal axis of a rocket motor incorporating one embodiment; and FIGURE 2 is a fragmentary sectional view taken along the longitudinal axis of rocket motor incorporating another embodiment.

Throughout the specification and drawings, like reference numbers designate like parts.

As illustrated, a preferred embodiment of this invention comprises a housing, generally designated by the number 10, which is part of a rocket motor casing 12. The longitudinal axis of rocket motor casing 12 is shown by the broken line marked ₵. It is to be understood that for the purposes of the appended claims the longitudinal axis of rocket motor casing 12 is also the longitudinal axis of a rocket motor of which rocket motor casing 12 is a part. Defined in housing 10 are first and second coaxial bores, generally designated by the numbers 14a and 14b and formed with shoulders 16a and 16b respectively. The longitudinal axes of bores 14a, 14b are perpendicular to the longitudinal axis of the rocket motor casing 12. A first inlet 18a extends laterally from first bore 14a and communicates with a propellant tank 20a, and a second inlet 18b extends laterally from second bore 14b and communicates with a propellant tank 20b. Also, a first outlet 22a extends laterally from first bore 14a between the longitudinal axis of rocket motor casing 12 and first inlet 18a, and a second outlet 22b extends laterally from second bore 14b between the longitudinal axis of said rocket motor casing and second inlet 18b.

Before the valve mechanism is actuated, first and second inlets 18a, 18b are hermetically sealed by shear cups 24a and 24b respectively, each of which is cup-shaped and has a circumferential groove to weaken the wall at the place where the cup is to be sheared. The shear cups are welded or brazed in inlets 18a, 18b and their closed end project into first and second bores 14a and 14b respectively.

A first and a second piston, generally designated by the numbers 26a and 26b, are disposed in first and second bores 14a and 14b respectively, each of said pistons having a first portion 28a, 28b and a second portion 30a, 30b slidably engaged with the wall of the bore in which it is positioned, and a third portion 32a, 32b intermediate to and having a smaller diameter than said first and second portions. Also, a recess 34a, 34b is formed in the second portion 30a, 30b of each of said pistons. Before the valve mechanism is actuated, the closed end of shear cup 24a is disposed in recess 34a and, similarly, the closed end of shear cup 24b is disposed in recess 34b. One end of a spring 36a fits into a recess 38a in first piston 26a, biasing said piston forward the longitudinal axis of the rocket motor casing 12, and the end of another spring 36b fits into a recess 38b in second piston 26b, biasing said piston toward the longitudinal axis of the rocket motor casing, but in the opposite direction to the bias of said first piston 24a. Two shear pins 40a, 40b, fixed in housing 10 and in pistons 26a, 26b, respectively, hold the latter in a first position, as illustrated in the drawing, where the end of the first portion 28a, 28b of each piston abuts the end surface 42a, 42b of the bore 14a, 14b within which it is disposed. A conventional source of pressurizing gas, not shown, is communicatively connected to each of bores 14a, 14b through ports 44a, 44b.

To effect propellant flow from the propellant tanks 20a, 20b, pressurizing gas is introduced into bores 14a, 14b, thereby moving pistons 26a, 26b outward and shearing shear pins 40a, 40b and shear cups 24a, 24b. Each piston 26a, 26b continues to move outward until it reaches a second position where the first portion 28a, 28b thereof engages a respective one of the shoulders 16a, 16b. When the pistons are in this second position, propellant can flow into first and second inlets 18a, 18b, around third portions 32a, 32b of the pistons, and out first and second outlets 22a, 22b.

Because pistons 26a, 26b operate in opposite directions, a shock load directed laterally against the rocket motor will affect only one of said pistons. Axially directed shock loads will not affect the pistons. If the rocket motor is subjected to a shock which displaces one of the pistons sufficiently to shear its shear pin 40a, 40b, after the shock the piston will be returned to its first position by its spring 36a, 36b, thereby sealing the valve against propellant flow. In the illustrated preferred embodiment, O-rings 44a, 44b, 46a, 46b, 48a and 48b are provided to seal off the valve mechanism. However, it will be understood that these O-rings may be omitted in some instances.

In the embodiment illustrated in FIGURE 2, elements structurally and functionally similar to corresponding elements of the embodiment illustrated in FIGURE 1 are designated by similar reference numerals with, however, the addition of the prefix "2" so that, for example, element 12 of FIGURE 1 corresponds to element 212 of FIGURE 2. In this embodiment, bores 214a, 214b are coaxial with the longitudinal axis of rocket motor casing 212, which axis is shown by the broken line marked ₵. However, it will be noted that pistons 226a, 226b move in opposite directions to initiate flow of liquid through the valve. By this arrangement, the valve is insensitive to shock loads directed laterally against the rocket motor. An axially directed shock load will affect only one of the pistons, and, if the shock load shears one of the shear pins 240a, 240b, after the shock the piston will be returned to its first position by its spring 236a, 236b, thereby sealing the valve against propellant flow.

It will also be recognized that the described valve mechanism provides various advantages, including increased shock resistance. Flow from the propellant tanks can be initiated simultaneously or individually. The ability of the valve to seal itself after accidental shearing of one of its shear pins is particularly advantageous where hypergolic propellants are used in the rocket motor.

While detailed embodiments of the invention have been described and illustrated, it will be understood that various modifications and changes may be made without departing from the scope of the invention.

What is claimed is:
1. In a rocket motor, a valve mechanism comprising:
   a housing defining a bore the longitudinal axis of which is transverse to the longitudinal axis of said rocket motor, an inlet extending laterally from said bore, and an outlet extending laterally from said bore and spaced from said inlet longitudinally of said bore;
   a shear cup sealingly fixed to said inlet, at least a portion of said shear cup projecting into said bore;
   a piston disposed in said bore, said piston having first and second portions slidably engaged with the wall of said bore and a third portion intermediate said first and second portions and having a smaller diameter than the same, said second portion having a recess in which said projecting portion of said shear cup is disposed when said piston is in a first position relative to said bore;
   means for releasably holding said piston in said first position;
   means for biasing said piston toward said first position;
   means for pressurizing said bore at its end adjacent said longitudinal axis of said rocket motor, whereby said piston slides along said bore, shears said shear cup, and reaches a second position at which fluid can flow through said inlet, around said third portion of said piston, and out said outlet; and
   means for arresting movement of said piston at said second position.

2. In a rocket motor, a valve mechanism comprising:
   a housing defining first and second bores, a first inlet extending laterally from said first bore and spaced from an end thereof, a second inlet extending laterally from said second bore and spaced from an end thereof, a first outlet extending laterally from said first bore and spaced between said first inlet and an end of said first bore, and a second outlet extending laterally from said second bore and spaced between said second inlet and an end of said second bore;
   a first shear cup sealingly fixed to said first inlet, at least a portion of said shear cup projecting into said first bore;
   a seconnd shear cup sealingly fixed to said second inlet, at least a portion of said shear cup projecting into said second bore;
   a first piston disposed in said first bore, said piston having first and second portions slidably engaged with the wall of said bore and a third portion intermediate said first and second portions and having a smaller diameter than the same, said second portion having a recess in which said projecting portion of said first shear cup is disposed when said first piston is disposed in a first position relative to said bore;
   a second piston disposed in said second bore, said piston having first and second portions slidably engaged with the wall of said bore and a third portion intermediate said first and second portions and having a smaller diameter than the same, said second portion having a recess in which said projecting portion of said second shear cup is disposed when said second piston is disposed in a first position relative to said bore;
   means for releasably holding said first piston in said first position thereof;
   means for releasably holding said second piston in said first position thereof;
   means for biasing said first piston toward said first position thereof;
   means for biasing said second piston toward said first position thereof;
   means for pressurizing said first bore at an end thereof, whereby said piston slides along said bore, shears said first shear cup, and reaches a second position at which fluid can flow through said first inlet, around said third portion of said piston, and out said first outlet;
   means for arresting movement of said first piston at said second position thereof;
   means for pressurizing said second bore at its forward end, whereby said piston slides along said bore, shears said second shear cup, and reaches a second position at which fluid can flow through said second inlet, around said third portion of said piston, and out said second outlet; and
   means for arresting movement of said second piston at said second position thereof.

3. In a rocket motor, a valve mechanism comprising:
   a housing defining first and second coaxial bores respectively disposed on opposite sides of the longitudinal axis of said rocket motor and transverse thereto, a first inlet extending laterally from said first bore and spaced from said longitudinal axis of said rocket motor, a second inlet extending laterally from said second bore and spaced from said longitudinal axis of said rocket motor, a first outlet extending laterally from said first bore and spaced between said first inlet and said longitudinal axis of said rocket motor, and a second outlet extending laterally from said second bore and spaced between said second inlet and said longitudinal axis of said rocket motor;
   a first shear cup sealingly fixed to said first inlet, at least a portion of said shear cup projecting into said first bore;
   a second shear cup sealingly fixed to said second inlet, at least a portion of said shear cup projecting into said second bore;
   a first piston disposed in said first bore, said piston having first and second portions slidably engaged with the wall of said bore and a third portion intermediate said first and second portions and having a smaller diameter than the same, said second portion having a recess in which said projecting portion of said first shear cup is disposed when said first piston is disposed in a first position relative to said bore;
   a second piston disposed in said second bore, said piston having first and second portions slidably engaged with the wall of said bore and a third portion intermediate said first and second portions and having a smaller diameter than the same, said second portion having a recess in which said projecting portion of said second shear cup is disposed when said second piston is disposed in a first position relative to said bore;
   means for releasably holding said first piston in said first position thereof;
   means for releasably holding said second piston in said first position thereof;
   means for biasing said first piston toward said first position thereof;
   means for biasing said second piston toward said first position thereof;
   means for pressurizing said first bore at its end adjacent said longitudinal axis of said rocket motor, whereby said piston slides along said bore, shears said first shear cup, and reaches a second position at which fluid can flow through said first inlet, around said third portion of said piston, and out said first outlet;

means for arresting movement of said first piston at said second position thereof;

means for pressurizing said second bore at its end adjacent said longitudinal axis of said rocket motor, whereby said piston slides along said bore, shears said second shear cup, and reaches a second position at which fluid can flow through said second inlet, around said third portion of said piston, and out said second outlet; and means for arresting movement of said second piston at said second position thereof.

4. In a rocket motor, a valve mechanism comprising:

a housing defining first and second bores axially parallel with the longitudinal axis of said rocket motor, a first inlet extending laterally from said first bore and spaced from the forward end thereof, a second inlet extending laterally from said second bore and spaced from the rearward end thereof, a first outlet extending laterally from said first bore and spaced between said first inlet and the rearward end of said first bore, and a second outlet extending laterally from said second bore and spaced between said second inlet and the forward end of said second bore;

a first shear cup sealingly fixed to said first inlet, at least a portion of said shear cup projecting into said first bore;

a second shear cup sealingly fixed to said second inlet, at least a portion of said shear cup projecting into said second bore;

a first piston disposed in said first bore, said piston having first and second portions slidably engaged with the wall of said bore and a third portion intermediate said first and second portions and having a smaller diameter than the same, said second portion having a recess in which said projecting portion of said first shear cup is disposed when said first piston is disposed in a first position relative to said bore;

a second piston disposed in said second bore, said piston having first and second portions slidably engaged with the wall of said bore and a third portion intermediate said first and second portions and having a smaller diameter than the same, said second portion having a recess in which said projecting portion of said second shear cup is disposed when said second piston is disposed in a first position relative to said bore;

means for releasably holding said first piston in said first position thereof;

means for releasably holding said second piston in said first position thereof;

means for biasing said first piston toward said first position thereof;

means for biasing said second piston toward said first position thereof;

means for pressurizing said first bore at its rearward end, whereby said piston slides along said bore, shears said first shear cup, and reaches a second position at which fluid can flow through said first inlet, around said third portion of said piston, and out said first outlet;

means for arresting movement of said first piston at said second position thereof;

means for pressurizing said second bore at its forward end, whereby said piston slides along said bore, shears said second shear cup, and reaches a second position at which fluid can flow through said second inlet, around said third portion of said piston, and out said second outlet; and means for arresting movement of said second piston at said second position thereof.

References Cited

UNITED STATES PATENTS

| | | | |
|---|---|---|---|
| 2,930,187 | 3/1960 | Chillson | 60—39.14 |
| 3,111,133 | 11/1963 | Fulton | 137—68 |
| 3,122,154 | 2/1964 | Siebel | 137—68 |
| 3,137,128 | 6/1964 | Francais | 60—39.14 |

MARTIN P. SCHWADRON, *Primary Examiner.*

DOUGLAS HART, *Assistant Examiner.*

U.S. Cl. X.R.

137—68